(12) United States Patent
Bruce

(10) Patent No.: US 7,146,385 B1
(45) Date of Patent: Dec. 5, 2006

(54) SYSTEM AND METHOD FOR APPLICATION-TRANSPARENT SYNCHRONIZATION WITH A PERSISTENT DATA STORE

(75) Inventor: Jonathan M. Bruce, San Francisco, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 468 days.

(21) Appl. No.: 10/793,073

(22) Filed: Mar. 4, 2004

(51) Int. Cl.
*G06F 17/00* (2006.01)

(52) U.S. Cl. .................................... 707/201; 707/203

(58) Field of Classification Search ............ 707/201, 707/203; 709/204, 219; 719/315, 318
See application file for complete search history.

(56) References Cited

U.S. PATENT DOCUMENTS

| 2005/0055382 A1* | 3/2005 | Ferrat et al. ............... 707/201 |
| 2005/0071433 A1 | 3/2005 | Shah ........................ 709/207 |
| 2005/0080848 A1 | 4/2005 | Shah ........................ 709/204 |

FOREIGN PATENT DOCUMENTS

| WO | 01/45368 | 6/2001 |
| WO | 0169387 | 9/2001 |
| WO | 03/032613 | 4/2003 |

OTHER PUBLICATIONS

Stephen Rauch, Manage Data from Myriad Sources with the Universal Data Access Interfaces, Sep. 1997, pp. 1-20.*
"Overview of New Features," JDBC 2.1 Core API, Oct. 5, 1999, (1 page).
"The JDBC Tutorial: Chapter 5—Rowset Tutorial," http://java.sun.com/developer/books/JDBCTutorial/chapter5.html, Dec. 9, 2003, (13 pages).

* cited by examiner

Primary Examiner—Apu M. Mofiz
(74) Attorney, Agent, or Firm—Robert C. Kowert; Meyertons, Hood, Kivlin, Kowert & Goetzel, P.C.; Anthony M. Petro

(57) ABSTRACT

A system and method for application-transparent synchronization with a persistent data store. In one embodiment, the system may include a persistent data store configured to store a plurality of data items, such as a relational database, for example. The system may further include an application configured to modify a local data subset including a local copy of a given data item. The local data subset may be a disconnected rowset object, for example. Additionally, the system may include a first synchronization provider configured to synchronize the modified local data subset with the persistent data store, where synchronization of a given modified local copy with a corresponding data item occurs transparently to the application.

44 Claims, 7 Drawing Sheets

Persistent data store 150a

| Product name | Sales price | Cost | Units sold | Revenue | Profit |
|---|---|---|---|---|---|
| Product A | 150 | 100 | 50 | 7500 | 2500 |
| Product B | 32 | 30 | 200 | 6400 | 400 |
| Product C | 75 | 50 | 25 | 1875 | 625 |
| Product D | 30 | 20 | 42 | 1260 | 420 |
| Product E | 20 | 3 | 5 | 100 | 85 |

Data subset object 120a

| Product name | Cost | Revenue | Profit |
|---|---|---|---|
| Product C | 50 | 1875 | 625 |

Persistent data store 150b

| Product name | Supplier name | Supplier addr |
|---|---|---|
| Product A | Supplier G | Address G |
| Product B | Supplier G | Address G |
| Product C | Supplier F | Address F |
| Product D | Supplier H | Address H |
| Product E | Supplier J | Address J |

Data subset object 120b

| Product name | Supplier name | Units sold | Revenue | Profit |
|---|---|---|---|---|
| Product E | Supplier J | 5 | 100 | 85 |

FIG. 3

SYSTEM AND METHOD FOR APPLICATION-TRANSPARENT SYNCHRONIZATION WITH A PERSISTENT DATA STORE

BACKGROUND OF THE INVENTION

1. Field of the Invention

This invention relates to computer systems and, more particularly, to synchronization of persistent data stores.

2. Description of the Related Art

Computer systems are commonly configured to process large quantities of data on behalf of numerous applications and users. For example, some computer systems may be configured to track business activities at a whole-enterprise level, including manufacturing and production data, procurement data, sales data, human resources data, as well as many other types of data. Further, some such computer systems may execute applications configured to perform sophisticated functions on enterprise data, such as real-time inventory management, cash flow monitoring, web-based ordering, and other types of functions.

In some computer system software architectures, data may be stored (or "persisted") in large data repositories or "data stores." For example, one or more databases may be used as data stores for enterprise data. In some such architectures, data stores may be separate software systems from applications that generate, modify, or consume enterprise data, which may allow for greater flexibility in developing and maintaining applications.

Depending on the system implementation, applications may execute on distinct computer systems that may be remote from the computer systems implementing data stores. Additionally, a given application may process a substantial amount of data while executing a given operation. Consequently, in some embodiments an application may be configured to retrieve data from a data store and process it locally before committing any changes back to the data store.

If multiple applications are configured to perform local processing of data, it is possible that one application may modify data within a data store that another application is processing. In some instances, such data transience may create inconsistencies in application operation, for example if a given application operation is predicated on consuming the most recent value of a given data item. Consequently, in some embodiments that support local processing of application data, applications may include synchronization resources to detect and resolve conflicts that may occur when multiple applications access and modify the same data.

However, coding synchronization functionality into each application that requires it presents several shortcomings. For example, numerous possible methods for implementing data synchronization may exist, each method being more optimal for some data usage scenarios than others. Therefore, an application developer is required to choose and develop each foreseeable synchronization method for each application, thus increasing development and validation effort for each given application. Further, implementing synchronization functionality within each application may increase development redundancy, for example if the same synchronization functionality is employed by several applications. Finally, to the extent that the correctness of synchronization functionality at a system level requires each application to exhibit the same synchronization behavior (i.e., that each application implementing a given synchronization protocol does so consistently, so that protocol assumptions are uniform), implementing synchronization functionality within each application increases overall system validation effort.

SUMMARY

Various embodiments of a system and method for application-transparent synchronization with a persistent data store are disclosed. In one embodiment, the system may include a persistent data store configured to store a plurality of data items, such as a relational database, for example. The system may further include an application configured to modify a local data subset including a local copy of a given data item. The local data subset may be a disconnected rowset object, for example. Additionally, the system may include a first synchronization provider configured to synchronize the modified local data subset with the persistent data store, where synchronization of a given modified local copy with a corresponding data item occurs transparently to the application.

In one specific implementation of the system, the first synchronization provider may be configured to lock the given data item in the persistent data store, in response to the application modifying the local copy of the given data item.

In another specific implementation of the system, the first synchronization provider may be configured to determine whether a difference exists between an original value of the modified local copy of the given data item and the given data item stored in the persistent data store, in response to the application modifying the local copy of the given data item.

In one embodiment, the method may include storing a plurality of data items in a persistent data store, an application modifying a local data subset including a local copy of a given data item, and synchronizing the modified local data subset with the persistent data store, where synchronization of a given modified local copy with a corresponding data item occurs transparently to the application.

BRIEF DESCRIPTION OF THE DRAWINGS

FIG. 3 is a block diagram illustrating several exemplary embodiments of persistent data stores and data subset objects.

Figure 1:
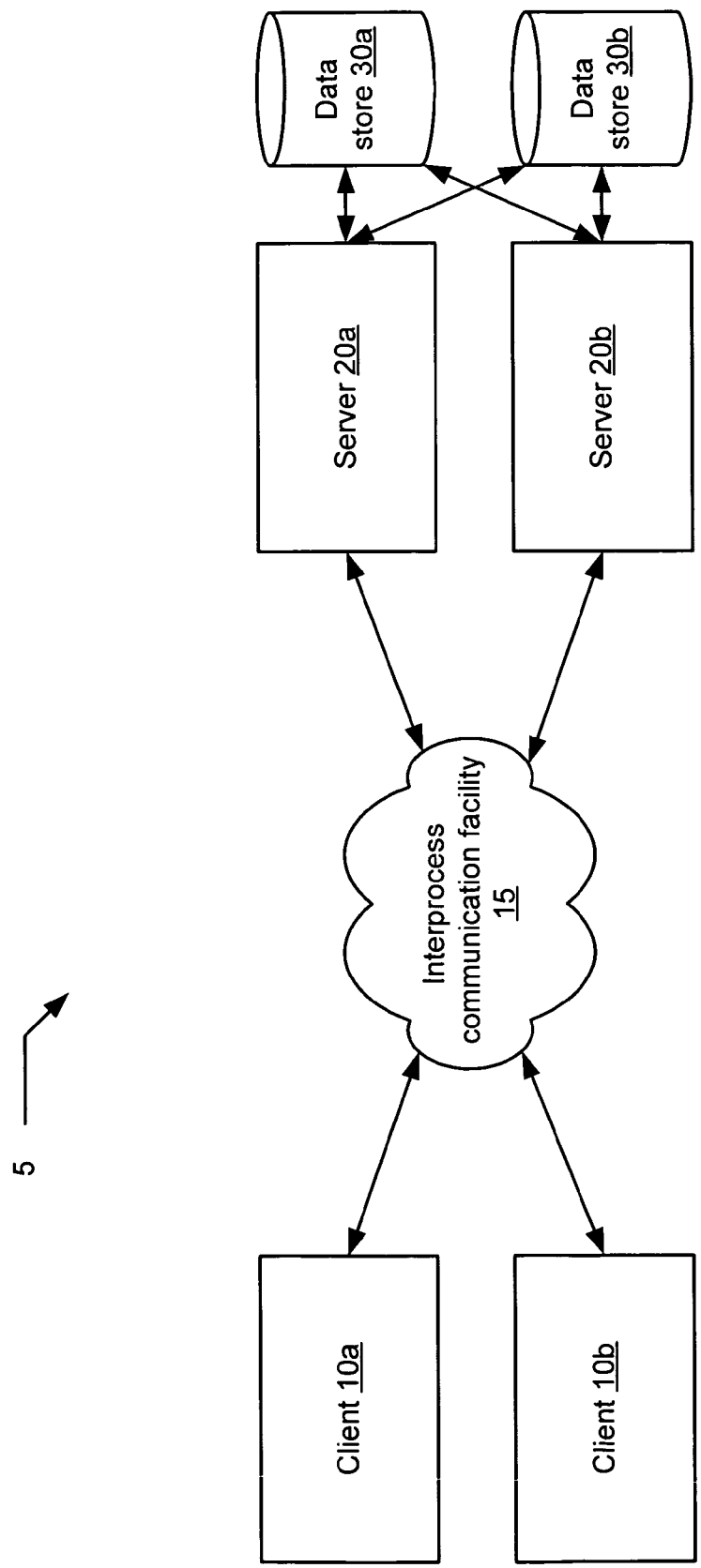
FIG. 1 is a block diagram illustrating one embodiment of a software system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Software System Architecture

Turning now to FIG. 1, a block diagram illustrating one embodiment of a software system is shown. In the illustrated embodiment, software system 5 includes a plurality of client processes 10a and 10b configured to communicate with a plurality of server processes 20a and 20b via an interprocess communication facility 15. Server processes 20a and 20b are in turn configured to communicate with a plurality of data stores 30a and 30b. It is noted that like reference numbers refer to like elements herein, and that a plurality of like elements distinguished by a letter suffix may be referred to generically in the plural or singular by a reference number without a letter suffix. For example, it is contemplated that in various embodiments, an arbitrary number of client processes 10, server processes 20, and data stores 30 may be employed.

In one embodiment, system 5 may be representative of a three-tier software architecture. Generally speaking, three-tier architectures provide separate processing resources for user interface processing, application or "business logic" processing, and data storage. For example, an inventory management system may be implemented as a three-tier system. In such a system, users may submit inventory transactions and queries such as sales, returns, ordering/procurement, and reporting operations via a user interface. Transactions and queries may be received and processed by application server processes, which may in turn access and modify a data store. For example, a given application server process may collect sales transactions from multiple point-of-sale user interfaces and update a database that includes inventory records to reflect the effects of item sales. A given application server process may also generate transactions in response to the effects of other transactions or detected database states. For example, an application server process may detect that as a result of sales activity, inventory of a particular item has fallen below a desired threshold. Responsively, the application server process may be configured to generate a purchasing transaction and/or to notify relevant personnel of the condition, such as by generating a report or sending an email.

In one embodiment of system 5, clients 10a and 10b may be configured as user interface clients, through which users may submit transactions or other types of processing requests. For example, clients 10 may be configured as web interface clients, coded in a platform-independent language such as Java, which a given user may access by navigating to a particular Uniform Resource Locator (URL) using a web browser. Alternatively, clients 10 may be configured as standalone, platform-specific client processes that may be invoked independently of a web browser.

Interprocess communication (IPC) facility 15 may be configured to convey processing requests and data between clients 10 and servers 20. In embodiments where clients 10a and 10b are configured to run on computer systems that are remote to the computer systems hosting servers 20a and 20b, IPC facility 15 may include networking protocols (such as Internet Protocol, for example) and system calls whereby the communicating processes may establish a network connection. In other embodiments, clients 10 as well as servers 20 may be configured to run on a single machine, such as a large server system. In such embodiments IPC facility 15 may comprise an application programming interface (API) whereby client and server processes may directly interact with one another. It is contemplated that in some embodiments, IPC facility 15 may implement a combination of network connectivity and direct interprocess communications via one or more APIs.

Server processes 20 may in one embodiment be configured to implement one or more applications for processing transactions, such as transactions received from client processes 10a or 10b. A given server process 20 may be implemented in a programming language such as Java or C++, for example, and may be configured to interact with clients 10a and 10b via IPC facility 15 as well as data stores 30a and 30b via an API. Referring to the inventory management example cited above, upon receiving a sales transaction from a given client 10b, a given server process 20a may be configured to query data store 30a to ascertain the current inventory level of the requested item. If the requested item is available, server process 20a may update data store 30a to reflect the effect of the sale on inventory, while if the requested item is not available, server process 20a may notify the requesting client 10b and may take further actions such as generating an order to replenish inventory, requesting customer information to generate a back-order record, or any other action. Server process 20a may further be configured to update financial records stored in data store 30b to reflect the effects of a sales transaction, such as by posting the actual sales price, terms of sale, discount applied, etc.

Data stores 30 may be configured to store data items on which server processes 20 may operate. In one embodiment, a given data store 30 may be configured as a relational database, storing data items in one or more tables including rows and columns, while in other embodiments given data store 30 may have a different data organization. Data stores 30a and 30b may also include software functionality for evaluating data queries submitted by server processes 20a and 20b and selecting data items to be returned in response to such queries, which functionality may be referred to as a query engine. Data stores 30 may provide an API through which a server process 20 may submit queries. For example, a given server process 20a may interact with a given data store 30b via the Java Database Connectivity (JDBC) standard API, the Open Database Connectivity (ODBC) standard API, or another API.

Although software system 5 has been described as a three-tier architecture, it is contemplated that in other embodiments, a different architecture may be employed. For example, in one alternative embodiment, client processes 10 and server processes 20 may be combined into a single software entity including both user interface and application logic functionality. In another embodiment, server processes 20 and data stores 30 may be combined into a single database/application logic entity. Additionally, it is contemplated that in various embodiments, client processes 10, server processes 20, and data stores 30 may be configured to operate on one or more computer systems, as described in greater detail below. For example, in one embodiment client processes 10 may be configured to operate on respective point-of-sale computer systems, whereas server processes 20 and data stores 30 may be configured to operate on one or more server computer systems. Numerous other mappings of specific processes to computer system hardware are possible and contemplated.

Data Manipulation and Synchronization

In some embodiments of software system 5, numerous transactions may be in various states of completion at any given point in time. For example, at one point in time, client processes 10 may be submitting new status or transaction requests to the system on behalf of one or more users and/or conveying results of previous requests to those users, while server processes 20 may be generating queries corresponding to previously received requests and data stores 30 may be evaluating previously received queries.

In one embodiment, server processes 20 may operate on data items stored within data stores 30 in a roughly synchronous fashion, such as by establishing and maintaining an interface connection with a pertinent data store 30 for the duration of a server processing operation, and updating the data store as results are generated by the operation. For example, a server process 20a may implement an operation to read inventory data from data store 30a, perform an analysis to determine whether to order additional inventory, and write data back to data store 30a indicating the quantity and type of newly ordered inventory. In performing this operation, server process 20a may be configured to open a connection to data store 30a via an API, which may include establishing a network connection and providing user authentication information to data store 30a. Server process 20a may then use the established connection to query data store 30a to retrieve the relevant inventory data, and may leave the connection open while performing its analysis. When new data is ready to be written to data store 30a, server process 20a may convey the new data via the previously established connection. Such a mode of operation may be referred to as a connected mode of operation.

Connected operation may allow a connected server process 20 to manipulate data items within a data store 30 without repeatedly incurring the overhead of establishing a connection to the data store. However, in some embodiments, data stores 30 may be capable of simultaneously servicing only a limited number of connections. In some such embodiments, system resources may be better utilized by allowing server processes 20 to obtain data and operate on it locally, in a disconnected fashion, prior to storing modified data items back to data stores 30. For example, in a system concurrently processing numerous transactions with variable operation latencies in server processes 20, allowing server processes to connect to data stores 30 only when data items need to be read or written may improve the ability of data stores 30 to service requests.

In one embodiment of a disconnect mode of operation, a given server process 20 may be configured to obtain a relevant subset of the data items stored in one or more data stores 30, such as by connecting to and querying the data store. Server process 20 may then be configured to disconnect from the data store and to store the obtained subset locally, such as in a buffer internal to server process 20, or as a distinct data object as described in greater detail below. The desired operations may then be performed on the locally stored, disconnected subset of data items.

The local, disconnected subset of data items may be transient, in that any changes made to the subset are not immediately reflected in the relevant data stores 30. Likewise, changes to data items within data stores 30 that correspond to data items within the disconnected subset (for example, changes due to modifications by other server processes 20) may not be immediately reflected in the disconnected subset. Data stores 30 may be referred to as persistent, in contrast to the transience of a given disconnected data subset.

As a consequence of this transience, in some embodiments server processes 20 may be configured to retain the original value (prior to any local modification) of each value in a given local, disconnected subset, and to compare the original value of a given data item in the given disconnected subset against a corresponding item within a data store 30 to determine whether the data item was changed in data store 30 subsequent to being read into the disconnected subset. This process may be referred to as data synchronization, or simply synchronization.

Transparent Synchronization

Numerous possible variations of synchronization strategies are possible and contemplated, as set forth in greater detail below. For example, in one embodiment only data items that have been locally modified within a given disconnected subset may be synchronized, whereas in another embodiment all data items in the disconnected subset may be synchronized regardless of their modification status. Further, the type of strategy employed may vary according to the expected volatility of the data items being considered.

In embodiments where synchronization is implemented directly within the application functionality of server processes 20, the complexity of developing and validating that functionality may be increased. For example, each server process 20 may need to independently implement each synchronization strategy whose use is foreseeable at the time the application functionality is developed. Such independent implementations may contribute to redundant development effort and may increase the possibility of implementation error.

Figure 2:
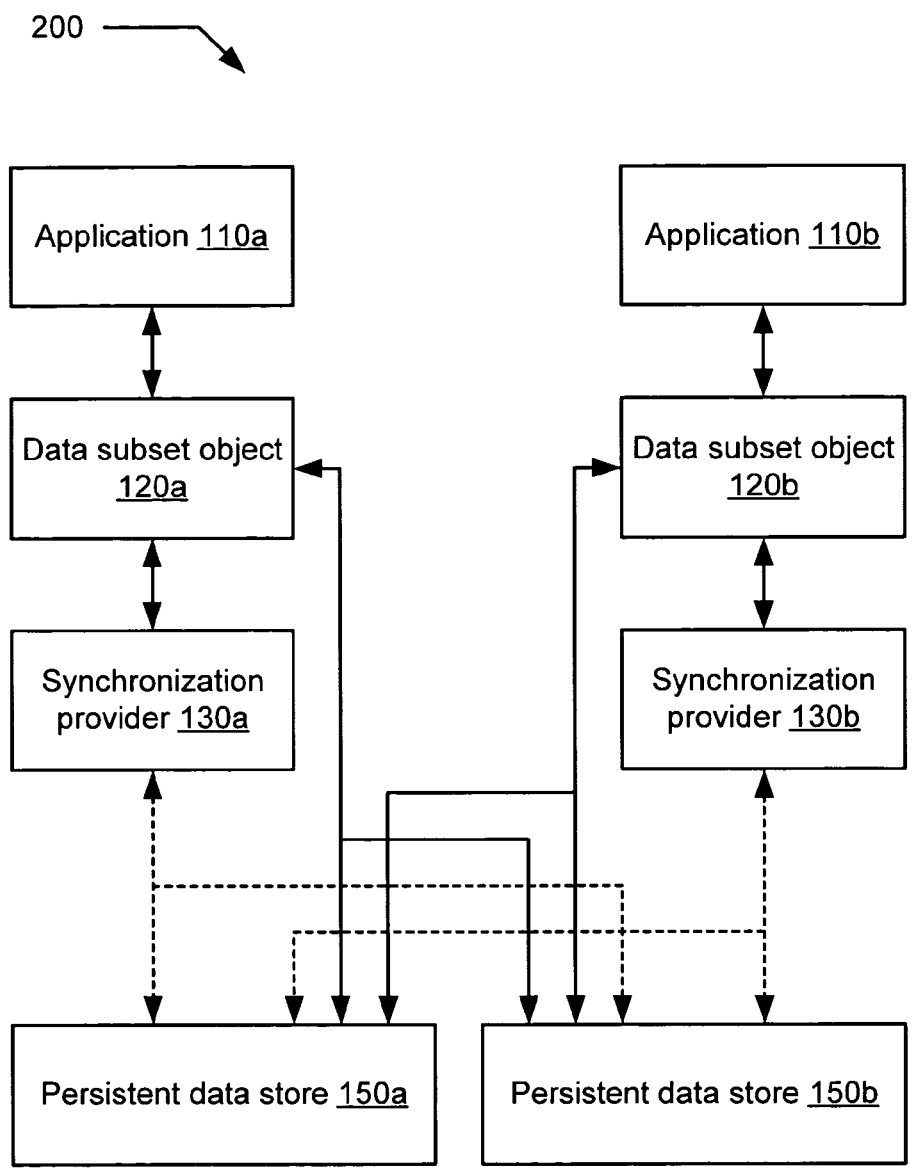
FIG. 2 is a block diagram illustrating one embodiment of a software system configured to provide transparent synchronization of a locally modified data subset.

By contrast, in some embodiments the synchronization of modified disconnected data may be implemented transparently to the application process that modified the data. FIG. 2 illustrates one embodiment of a software system configured to provide transparent synchronization of a locally modified data subset. System 200 includes applications 110a and 110b, each of which interacts with a respective data subset object 120a and 120b. Synchronization of each data subset object 120a–b is performed by a respective synchronization provider (SP) 130a and 130b. Both data subset objects 120a–b and SPs 130a–b are configured to interact with each of a plurality of persistent data stores 150a and 150b. It is contemplated that in various embodiments, system 200 may implement arbitrary numbers of applications 110, data subset objects 120, synchronization providers 130, and persistent data stores 150.

In the illustrated embodiment, applications 110 may be illustrative of server processes 20a–b of FIG. 1. For example, applications 110 may be configured to generate queries to data stored in persistent data stores 150 and to locally process such data in response to requests from client processes, such as client processes 10 of FIG. 1. Applications 110 may allocate corresponding data subset objects 120 to store local, disconnected subsets of data items for application processing, wherein each data item stored within a given data subset object 120 may be a local copy of a data item stored in one of persistent data store 150. In some embodiments, an application may populate a given data subset object with a disconnected subset of data items by submitting a query specifying the desired subset to one or more of persistent data stores 150. Such a query may be formulated in any suitable query language, such as Structured Query Language (SQL), for example.

In one embodiment, data subset objects 120 may be rowsets structured as subsets of database tables, such as JDBC rowsets, for example. In some embodiments, data subset objects 120 may be object-oriented-programming (OOP) software objects and may include data as well as procedural methods. In other embodiments, data subset objects 120 may be implemented as simple buffers that may be allocated internally to their corresponding applications 110.

Synchronization providers 130 may be configured as software modules separate from applications 110. In the illustrated embodiment, a given SP 130 may be configured to monitor modifications to a given data subset object 120 by a corresponding application 110, and to synchronize the data items stored in data subset object 120 with their corresponding items stored within persistent data stores 150 according to a particular grade of synchronization. For example, as described in greater detail below, a given SP 130 may implement an optimistic grade of synchronization that assumes changes by other applications to data items within a given data subset object 120 are generally unlikely, or a pessimistic grade of synchronization that assumes that such changes are generally likely. It is noted that in the illustrated embodiment, synchronization activities performed by an SP 130 may occur without intervention on the part of corresponding application 110.

In some embodiments, a plurality of types of SP 130 may be provided, with each SP 130 configured to implement a particular grade of synchronization, and a given application 110 may be configured to select a specific SP 130 to be used dependent upon a desired grade of synchronization. For example, a given application 110 may have some information regarding volatility of a particular data subset object 120 and may select a specific SP 130 that implements a synchronization grade consistent with that information. In some embodiments, such an application 110 may select a SP 130 at the time data subset object 120 is instantiated or initialized, for example through a constructor method in embodiments where data subset object 120 is an OOP software object. In other embodiments an application 110 may assign or reassign an SP 130 to a data subset object 120 at any time. In some embodiments, if an application 110 does not specify a particular SP 130 when a given data subset object 120 is instantiated or initialized, a default SP 130 may be associated with the given data subset object 120.

Persistent data stores 150 may be illustrative of data stores 30 of FIG. 1. In various embodiments, persistent data stores 150 may be relational databases comprising one or more tables including data items organized in rows and columns. Alternatively, data items stored within persistent data stores 150 may be structured in other formats, such as self-describing data formats using tags to describe and delimit data items. For example, in one embodiment a given persistent data store 150 may use Extensible Markup Language (XML) tags to structure stored data items, although use of any suitable self-describing data format is contemplated. In some embodiments, a combination of different types of persistent data stores 150 may be employed. Generally speaking, data items stored in persistent data stores 150 are persistent in that they may be visible to any application 110. In contrast, data items stored within a given data subset object 120 may be transient, in that they may not be visible to applications 110 other than the particular application 110 corresponding to given data subset object 120 until those data items are synchronized with the relevant persistent data store 150.

In the illustrated embodiment, data subset objects 120 may be populated with data items that comprise subsets of one or more persistent data stores 150. Where a given data subset object 120 includes data items corresponding to more than one persistent data store 150, its corresponding SP 130 may be configured to synchronize each respective data item within data subset object 120 with its respective persistent data store 150.

Several exemplary embodiments of persistent data stores 150 and data subset objects 120 are illustrated in FIG. 3. In the illustrated embodiment, persistent data store 150a includes a database table of financial information for a collection of products. Specifically, persistent data store 150a includes columns designated "product name," "sales price," "cost," "units sold," "revenue," and "profit" as well as rows for each of five products designated A–E. The intersection of each row and each column designates a data item that may store a particular value, such as a text value or a numerical value.

Data subset object 120a, in the illustrated embodiment, corresponds to a subset of the data items stored in persistent data store 150a. Specifically, data subset object 120a includes columns designated "product name," "cost," "revenue," and "profit," which columns are populated by data items corresponding to the row of persistent data store 150a associated with product C. Data subset object 120a might result from any of a number of queries submitted by an application such as application 110a of FIG. 2. For example, such an application may submit a query requesting the data items "product name," "cost," "revenue," and "profit" corresponding to the row having "product name" equal to "Product C." Alternatively, such an application may submit a query for the same data items for any row having a "profit" value between 500 and 700. Numerous other possible queries may result in the data values shown populating data subset object 120a.

Persistent data store 150b includes a database table of supplier contact information for a collection of products. In the illustrated embodiment, the table is formatted into rows and columns similar to those shown in persistent data store 150a. Specifically, persistent data store includes columns designated "product name," "supplier name," and "supplier address" and rows for each of the aforementioned five products A–E.

Data subset object 120b differs from data subset object 120a in the illustrated embodiment, in that data subset object 120b includes data values corresponding to values stored in both persistent data stores 150a and 150b (i.e., data subset object 120b results from a "join" of persistent data stores 150a–b). Specifically, data subset object 120b includes a column "product name" common to both persistent data stores 150a and 150b, as well as a column "supplier name" corresponding to persistent data store 150b and columns "units sold," "revenue," and "profit" corresponding to persistent data store 150a. In the illustrated embodiment, data subset object 120b is populated with data values corresponding to the respective rows of persistent data stores 150a–b associated with product E. As with data subset object 120a, data subset object 120b may result from numerous possible queries submitted by an application.

It is noted that any of the exemplary embodiments of persistent data stores 150 may include more than one table, and that such tables as well as the data subset objects 120 described above may include different numbers and designations of rows and/or columns, depending on implementation requirements. It is also contemplated that in various embodiments, data subset objects 120 of arbitrary complexity of rows and columns may result from queries selecting rows and columns from an arbitrary number of joined persistent data stores 150. Further, as noted previously, in some embodiments persistent data stores 150 and data subset objects 120 may include data formatted in other than a tabular structure, such as data formatted in a self-describing format, for example.

Figure 4:
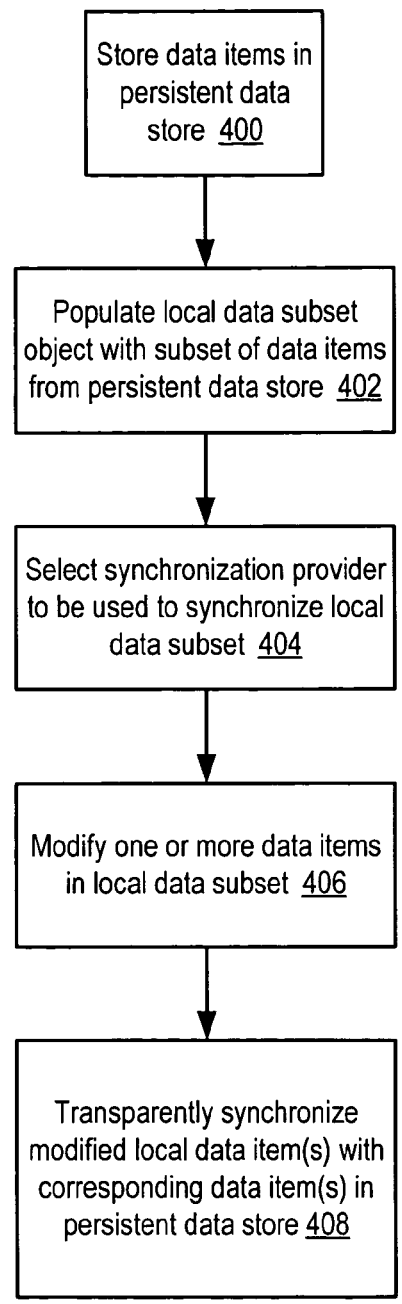
FIG. 4 is a flow diagram illustrating the operation of one embodiment of a method of transparent synchronization of a subset of data items with corresponding data items stored in one or more persistent data stores.

FIG. 4 illustrates one embodiment of a method of transparent synchronization of a subset of data items with corresponding data items stored in one or more persistent data stores. Referring collectively to FIG. 1 through FIG. 4, operation begins in block 400 where a plurality of data items are stored in a persistent data store. For example, in one embodiment a given persistent data store 150 may be initialized with data values structured into database tables or other structures.

A given application may subsequently populate a local buffer or object with a subset of data items stored in the persistent data store (block 402). For example, in one embodiment an application 110 may submit a query to one or more persistent data stores 150 to obtain a subset of data items, which may then be used to populate a data subset object 120. As described above, data subset object 120 may be a rowset object in some embodiments, such as a JDBC rowset object, for example.

The given application may also specify a particular synchronization provider to be used to synchronize the local data subset (block 404). For example, in one embodiment application 110 may specify a particular SP 130 at the time data subset object 120 is instantiated, or alternatively at a later time. Additionally, application 110 may select SP 130 from a plurality of synchronization providers according to a desired grade of synchronization.

Following population of the local data subset, the given application may modify one or more data items included in the local data subset (block 406). For example, application 110a of FIG. 2 may be configured to modify the "cost" and "profit" data items stored within data subset object 120a of FIG. 3 in response to a transaction initiated by a user to adjust inventory costs.

Subsequent to modification of the local data subset, the selected synchronization provider may synchronize the modified local data items with the corresponding data items stored within the relevant persistent data store, where the synchronization occurs transparently to the modifying application (block 408). For example, in one embodiment application 110 may issue a commit operation to the selected SP 130 subsequent to modifying data. In response to detecting the commit operation, SP 130 may synchronize the corresponding data subset object 120 according to a particular synchronization grade. Alternatively, SP 130 may synchronize data subset object 120 without detecting a commit operation. For example, SP 130 may synchronize data subset object 120 after detecting that a given number of data items stored therein have been modified, or after detecting that a given interval of time has elapsed since a previous synchronization. In any case, the specific synchronization of a given data item of data subset object 120, such as by comparing the original, unmodified value of the data item with the current value of the corresponding data item within persistent data store 150, may be performed entirely by SP 130, transparently to the modifying application 110.

Synchronization Grades

As noted above, in some embodiments of system 200 multiple synchronization providers 130 may be available, from which a given application 110 may select a particular SP 130 dependent on the synchronization grade it provides. By selecting a synchronization grade that corresponds to the expected volatility of the selected data items in a given data subset object 120, system resources may be more optimally distributed. For example, in one embodiment, synchronization of modified local data may not be required because the underlying persistent data store 150 does not support techniques for ensuring coherence of multiple data writers (e.g., certain XML implementations). In such an embodiment, an SP 130 that performs no synchronization, but rather simply propagates modified data items in a given data subset object 120 directly into the corresponding persistent data store 150, may be selected, and the computational overhead associated with synchronization may be avoided.

In other cases, a particular SP 130 implementing an optimistic or pessimistic synchronization grade may be selected depending on the likelihood that data items within corresponding data subset object 120 will be modified by other applications 110. For example, a particular application 110a may be configured to perform an operation on a data field (e.g., a row or column, or other general record type) within a given persistent data store 150, which data field is rarely (or alternatively, often) accessed by other applications 110. Correspondingly, application 110a may select an instance of SP 130 that provides an optimistic (or alternatively, pessimistic) synchronization grade.

Figure 5:
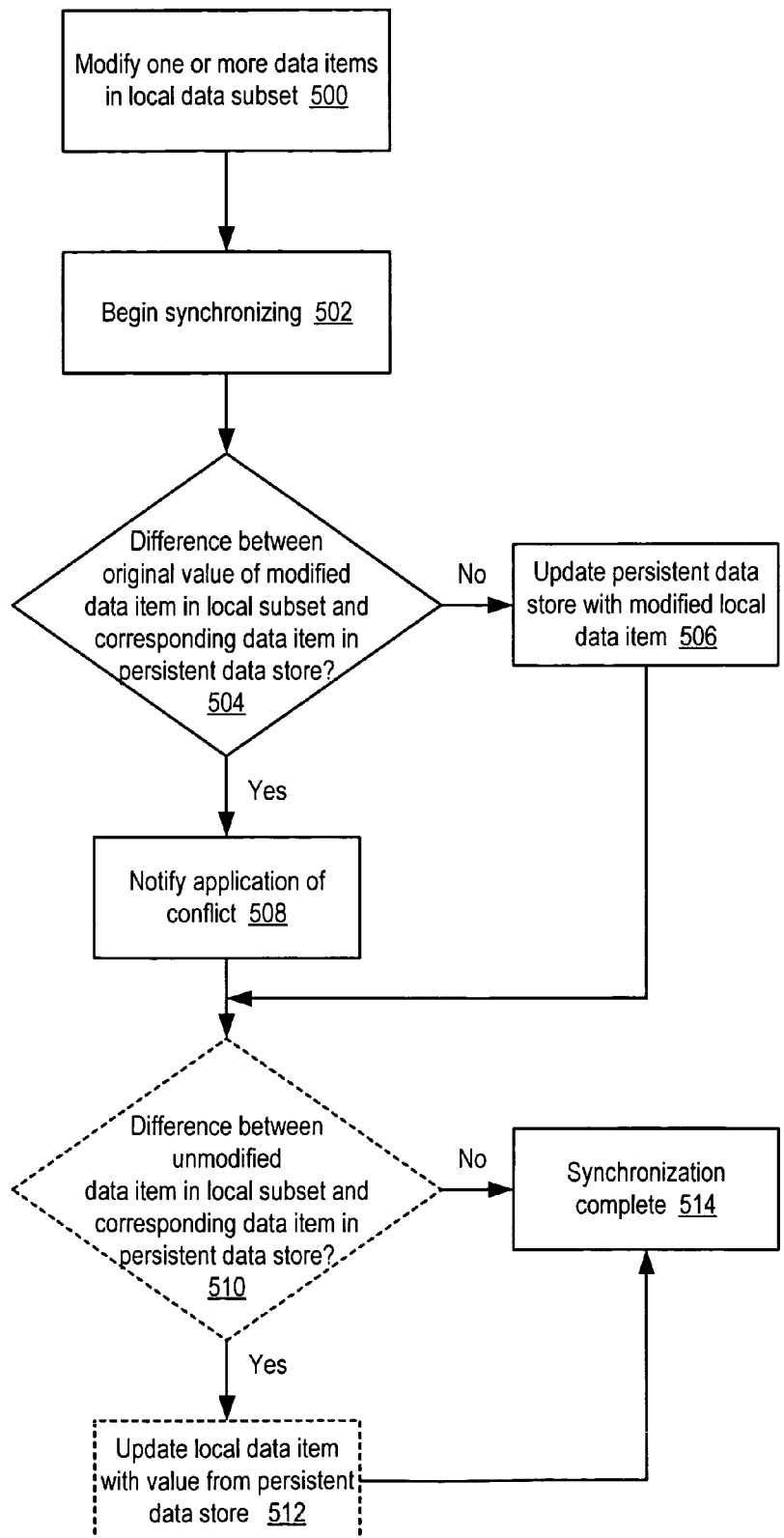
FIG. 5 is a flow diagram illustrating the operation of one embodiment of an optimistic synchronization grade.

FIG. 5 illustrates the operation of one embodiment of an optimistic synchronization grade. Referring collectively to FIG. 2 and FIG. 5, operation begins in block 500 where a given application 110 modifies one or more data items stored within a local, disconnected data subset object 120. It is noted that in one embodiment, the data subset object 120 may have been previously allocated and a corresponding SP 130 previously selected as illustrated in the method of FIG. 4.

At some point after modification of data subset object 120, SP 130 may begin synchronizing (block 502). For example, given application 110 may convey a commit operation to SP 130, or SP 130 may detect some other criterion for synchronization, such as the expiration of a specified interval of time since the last synchronization.

SP 130 may then synchronize each modified data item within data subset object 120. In one embodiment, SP 130 may determine whether a difference exists between an original, pre-modification value of a given modified data item within data subset object 120 and the corresponding data item stored in persistent data store 150 (block 504). If no difference exists, SP 130 may update persistent data store 150 to reflect the data item as modified within data subset object 120 (block 506). If a difference does exist, SP 130 may notify given application 110 that a conflict has occurred (block 508). In some embodiments, SP 130 may check all modified data items and update persistent data store 150 in each case that no conflict is detected, while in other embodiments, SP 130 may abort synchronizing after the first conflict is detected.

Additionally, in some embodiments SP 130 may determine whether a difference exists between an unmodified data item within data subset object 120 and the corresponding data item stored in persistent data store 150 (block 510). If such a difference is detected, SP 130 may update the data item within data subset object 120 with the value indicated in persistent data store 150 (block 512). For example, even though given application 110 may not have modified a particular data item within data subset object 120, that data item may have been modified within persistent data store 150 by a different application 110 subsequent to initialization of data subset object 120. In some instances, given application 110 may require that all data items within data subset object 120 be current with respect to the relevant persistent data store 150. If no difference is detected at block 510, or if the embodiment of SP 130 does not implement synchronization of unmodified local data, synchronization is complete at block 514.

As just illustrated, optimistic synchronization grades may generally assume that conflicts where multiple applications attempt to write the same data item to a given persistent data store 150 will not occur, and may generally make no attempt to prevent conflicts from occurring. In contrast, pessimistic synchronization grades may generally assume that such conflicts are likely, and may attempt to prevent them. In some embodiments, SPs 130 that implement pessimistic synchronization grades use locks of varying scope to prevent conflicts from occurring.

Generally speaking, a lock may be a convention employed by a data source, such as a persistent data store 150, configured to coordinate access to one or more data items. For example, a lock may be a semaphore or status field stored within persistent data store 150 along with data items that may be asserted or deasserted to indicate the status of the lock. In various embodiments, locks may be implemented with differing degrees of granularity. For example, a given persistent data store 150 may be configured to support locking of individual data items. Further, if persistent data store 150 organizes data into tables including rows and columns, locking of entire rows, columns, or tables may be supported, as may the entirety of persistent data store 150. In some embodiments, more than one of these types of locks may be concurrently available. Further, it is contemplated that in some embodiments, locks having granularity other than the types just described may be employed.

Figure 6:
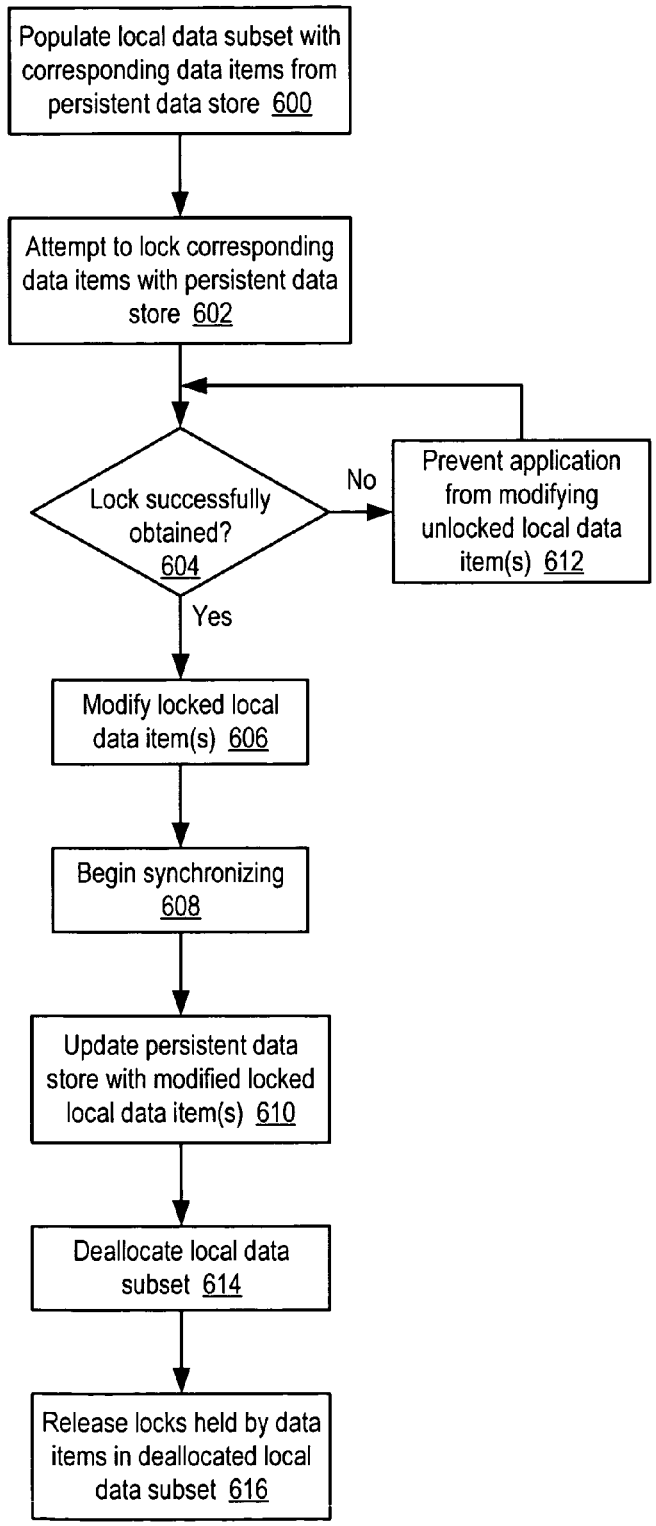
FIG. 6 is a flow diagram illustrating the operation of one embodiment of a pessimistic synchronization grade.

One embodiment of operation of a pessimistic synchronization grade employing locks is illustrated in FIG. 6. Referring collectively to FIG. 2 and FIG. 6, operation begins in block 600 where a given application 110 populates a local, disconnected data subset object 120 with one or more data items, such as in response to a query of one or more persistent data sources 150 as described previously. As in the optimistic synchronization embodiment described previously, it is noted that in one embodiment, the data subset object 120 may have been previously allocated and a corresponding SP 130 previously selected as illustrated in the method of FIG. 4.

In response to given application 110 populating data subset object 120 with data items, SP 130 may be configured to attempt to lock the corresponding data items within their respective persistent data stores 150 (block 602). In one embodiment, locking a data item within a persistent data store 150 may include SP 130 querying that persistent data store 150 to determine whether the data item has already been locked, such as by a different SP 130 on behalf of a different application 110. If no previous lock exists, the locking attempt may succeed. For example, persistent data store 150 may return an indication to SP 130 indicating lock success or failure.

After attempting to lock a given data item, SP 130 may determine whether it successfully obtained a lock (block 604). If so, given application 110 may proceed to modify the data items within data subset object 120 (block 606). At some point after modification of data subset object 120, SP 130 may begin synchronizing (block 608). For example, given application 110 may convey a commit operation to SP 130, or SP 130 may detect some other criterion for synchronization, such as the expiration of a specified interval of time since the last synchronization.

For modified data items within data subset object 120 for which locks were successfully obtained, SP 130 may be configured to update persistent data store 150 to reflect those data items as modified within data subset object 120 (block 610). In one embodiment, no further comparison to determine whether a difference exists between the original, pre-modification value of the locked modified data item and the corresponding data item stored in persistent data store 150 may be necessary, as the lock may ensure that the data item stored in persistent data store 150 remains unmodified by another SP 130.

If SP 130 did not successfully obtain a lock for a given data item within data subset object 120, in one embodiment SP 130 may prevent given application 110 from modifying that given data item (block 612) while SP 130 continues attempting to obtain a lock (block 604). For example, SP 130 may convey an indication to given application 110 that the unlocked data item is not writable. If a lock is ultimately obtained, execution may proceed from block 606, where given application 110 may modify the locked data items within data subset object 120.

Subsequent to synchronization, given application 110 may deallocate data subset object 120 (block 614) in response to which SP 130 may release locks held on corresponding data items within persistent data store 150 (block 616).

In the aforementioned locking protocol embodiment, locks are generally mandatory, in that modification of a data item by an application 110 may not occur until a lock is obtained. However, numerous other possible embodiments of lock implementations are possible and contemplated. For example, in one alternative embodiment, SP 130 may check the status of a lock prior to synchronizing a corresponding given data item. If a previously obtained lock is no longer asserted, SP 130 may compare the original value of a modified data item within data subset object 120 with the corresponding value within the relevant persistent data store 150 to check for conflicts, as described above in the embodiment illustrated in FIG. 5. In such an embodiment, given application 110 may proceed to modify a given data item within data subset object 120 even though SP 130 was not able to obtain a lock for the given data item. In this case, SP 130 may instruct persistent data store 150 to deassert the existing lock, and may also perform the conflict-detection comparison described above when synchronizing the given data item. In such an alternative embodiment, locks are generally advisory, in that a lock may not be guaranteed to be held until released (i.e., deasserted) by the original lock requester, but rather may be "broken" by a subsequent lock requester.

In still another embodiment, SP 130 may be configured to attempt to lock a given data item only when a given application 110 modifies that data item within data subset object 120, rather than attempting to lock each data item at the time data subset object 120 is populated. Further, in such an embodiment, SP 130 may be configured to release a previously granted lock following synchronization of the modified data item with persistent data store 150, rather than releasing such locks when given application 110 deallocates data subset object 120.

Numerous other variants of optimistic and pessimistic synchronization grades are possible and contemplated. It is noted that, as illustrated in the previously described embodiments, a given application 110 may be configured to select a desired synchronization grade for a given data subset object 120 by selecting a particular SP 130 to synchronize that object. Further, it is noted that the actual procedural steps of synchronizing that object may be performed by the selected SP 130, rather than by given application 110 itself.

Resolving Synchronization Conflicts

As described above, in some instances a synchronization provider may detect a conflict in the process of synchronizing a particular data item. In some embodiments, upon detecting a conflict, a given SP 130 may indicate the conflict to the corresponding application 110. For example, SP 130 may generate or "throw" an exception that is then conveyed to or "caught" by corresponding application 110.

In some embodiments, additional information about the conflict may be provided to application 110. For example, in one embodiment SP 130 may be configured to create a new data subset object 120, which may be referred to as a resolver object, in response to detecting a conflict associated with synchronizing a data item of an existing data subset object 120. A given resolver object 120 may be configured with the same data structure as its corresponding data subset object 120; for example, the two may share the same number of data rows and columns. In one embodiment, a given resolver object 120 may include only those values from persistent data store(s) 150 for which a conflict occurred when attempting to synchronize corresponding data subset object 120, while setting all nonconflicting data items to a default or null value. In another embodiment, a given resolver object 120 may include all corresponding values from persistent data store(s) 150 while indicating conflicting data items, such as by flagging conflicting items.

In addition to the values of conflicting data items, resolver object 120 may include additional information regarding the source of the conflict. In one embodiment, resolver object 120 may define one or more additional data fields corresponding to each data item, where the additional data fields indicate the type of operation that was underway at the time the conflict was detected. For example, resolver object 120 may indicate via the additional data fields that a given data item of corresponding data subset object 120 was being inserted into, deleted from, or simply updated within a given persistent data store 150. Broadly speaking, any information regarding the source of a particular conflict may be referred to as conflict status information.

In some embodiments in which locks are supported as described above, resolver object 120 may variously attempt to lock rows, columns, tables, or the entirety of the persistent data store 150 corresponding to each conflicting data item, according to the lock implementation. Such locking of conflicting data items may simplify conflict resolution by preventing other applications 110 from modifying data items known to at least one application 110 to be in conflict.

An application 110 may be configured to utilize a resolver object 120 to resolve synchronization conflicts when they occur. In one embodiment, when notified of a conflict (such as by catching an exception thrown by SP 130, for example) an application 110 may interact with resolver object 120 to identify the conflicting data items and reasons for the conflict. In some embodiments, resolver object 120 may present the same types of methods of navigation as do data subset objects 120, such as methods for navigating to a particular row or column in absolute and/or row- or column-relative terms. In some instances, data item conflicts may be infrequent, and a given resolver object 120 configured to store only conflicting data items may be correspondingly sparse. Therefore, in some embodiments, additional navigation methods for resolver object 120 may be provided that may, for example, more efficiently navigate to rows and/or columns including conflict values while skipping those that do not.

After navigating resolver object 120 to retrieve available information regarding a conflict, application 110 may be configured to choose how to resolve the conflict. For example, application 110 may determine that the data value in data subset object 120 is the value that should be persisted within persistent data store 150. Alternatively, application 110 may discard the conflicting data item stored within data subset object 120 in favor of the copy of the conflicting data item stored within resolver object 120 (i.e., the data value reflected within persistent data store 150 at the time the conflict was detected). In some embodiments, resolver object 120 may present methods whereby application 110 may specify a data value to be persisted. In such embodiments, resolver object 120 may interact with SP 130 to overwrite the data item in the data store accordingly. In other embodiments, application 110 may interact directly with SP 130 to specify data values to be persisted after obtaining conflict information from resolver object 120. In some embodiments, if application 110 determines that it should discard the value in data subset object 120 in favor of the value in resolver object 120, application 110 may be configured to take further action. For example, in such a case application 110 may be configured to recompute other data items whose values depend on the conflicting data item.

Exemplary Computer System

Figure 7:
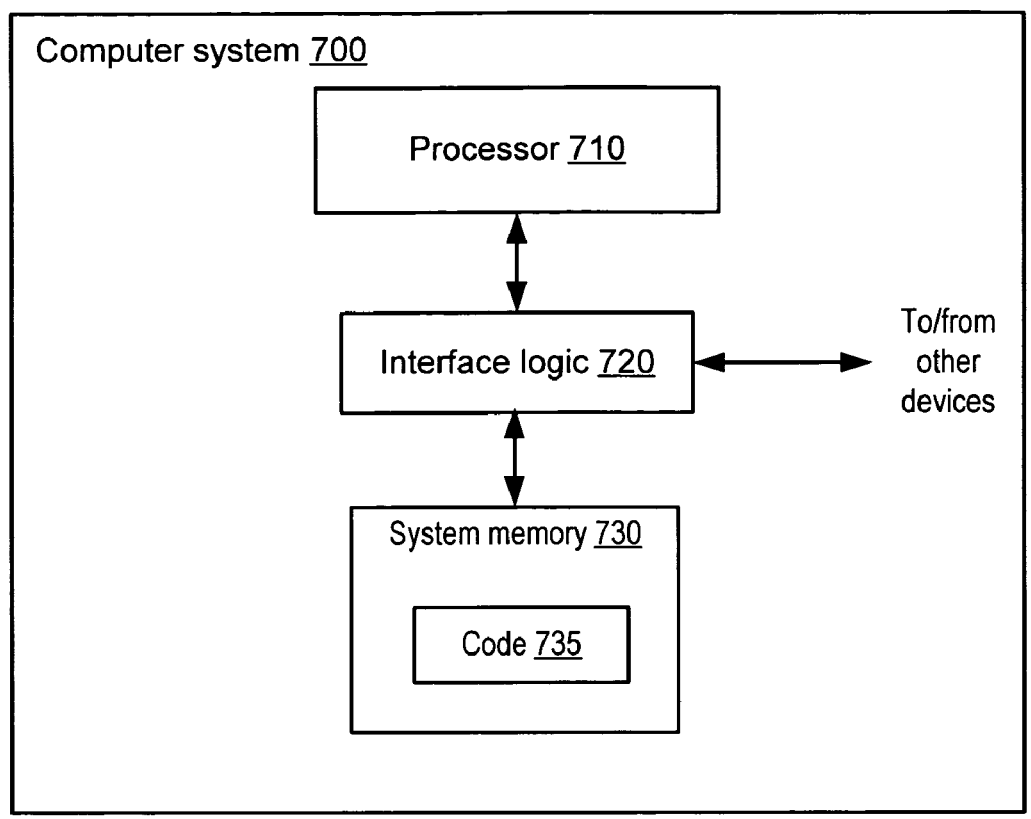
FIG. 7 is a block diagram illustrating one embodiment of an exemplary computer system.

Referring once again to FIGS. 1 and 2, as described above, in various embodiments any of the software modules shown as part of software systems 5 and 200 may be executed on one or more computer systems. One exemplary embodiment of a computer system is illustrated in FIG. 7. In the illustrated embodiment, computer system 700 includes a processor 710 coupled to a system memory 730 via interface logic 720.

Processor 710 may be any type of processor. In some embodiments, processor 710 may be a general-purpose microprocessor that implements one or more instruction set architectures such as x86, Power/PowerPC, SPARC, or any other suitable architecture or variant thereof. In other embodiments, processor 710 may be an embedded processor, a digital signal processor, or another processor capable of executing instructions. In the illustrated embodiment, processor 710 may be configured to access system memory 730 or another device to store and retrieve program instructions and data.

Interface logic 720 may be configured as bridge logic. In some embodiments, interface logic 720 may function as a "north bridge" coupling processor 710 and system memory 730, and may be configured to translate memory access requests originating from processor 710 to the appropriate format for system memory 730 and vice versa. In such an embodiment, interface logic 720 may also be configured for coupling to other peripheral buses to which peripheral devices may be attached, such as graphics adapters, storage devices, network interfaces, and other such devices. In some embodiments, interface logic 720 may couple to a "south bridge" interface circuit (not shown), which may be configured for coupling to additional peripheral devices such as pointing devices, keyboards, etc. In other embodiments, interface logic 720 may incorporate all peripheral interface logic in addition to providing a memory interface. It is contemplated that in some embodiments, all or part of interface logic 720 may be incorporated into processor 710.

System memory 730 may include any of various types of memory technologies, or combinations thereof. In some embodiments, system memory 730 may be largely comprised of some variant of synchronous dynamic RAM (SDRAM), but in other embodiments static RAM (SRAM) or another RAM technology may be used. In some embodiments, system memory 730 may include additional resources for error detection and/or correction, such as parity bits or error correcting code (ECC) bits, which may be separate from resources dedicated to storage of data or instructions.

In some embodiments, system memory 730 may be one embodiment of a computer-accessible medium configured to store program instructions executable by processor 710 as well as data accessible by processor 710. The program instructions and data may comprise any software program, module or application, such as any of the software modules illustrated in FIG. 1 or FIG. 2, for example. Such program instructions and data are illustrated as code 735 within system memory 730 in the illustrated embodiment. However, in other embodiments, program instructions and/or data may be received, sent or stored upon different types of computer-accessible media. Generally speaking, a computer-accessible medium may include storage media or memory media such as magnetic or optical media, e.g., disk or CD-ROM, such as may be coupled to computer system 700 through interface logic 720, for example. A computer-accessible medium may also include volatile or non-volatile media such as RAM (e.g. SDRAM, DDR SDRAM, RDRAM, SRAM, etc.), ROM, etc, such as may be included within system memory 730. Further, a computer-accessible medium may include transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
    a persistent data store configured to store a plurality of data items;
    a plurality of applications each configured to modify respective local data subsets including local copies of one or more of said plurality of data items, wherein a given one of said plurality of applications is configured to modify a given local data subset including a local copy of a given one of said data items; and
    a first synchronization provider instance distinct from each of said applications and configured to synchronize said modified local data subsets with said persistent data store, wherein for any of said applications, synchronization of a given modified local copy in a respective local data subset with a corresponding data item in said persistent data store occurs transparently to said applications.

2. The system as recited in claim 1, wherein in response to said given application modifying said local copy of said given data item, said first synchronization provider instance is configured to lock said given data item in said persistent data store.

3. The system as recited in claim 2, wherein to lock said given data item in said persistent data store, said first synchronization provider instance is further configured to lock a row of said persistent data store.

4. The system as recited in claim 2, wherein to lock said given data item in said persistent data store, said first synchronization provider instance is further configured to lock a table of said persistent data store.

5. The system as recited in claim 2, wherein to lock said given data item in said persistent data store, said first synchronization provider instance is further configured to lock said persistent data store in its entirety.

6. The system as recited in claim 1, wherein in response to said given application modifying said local copy of said given data item, said first synchronization provider instance is configured to determine whether a difference exists between an original value of said modified local copy of said given data item and said given data item stored in said persistent data store.

7. The system as recited in claim 6, wherein in response to said given application modifying said local copy of said given data item, said first synchronization provider instance is further configured to determine whether a difference exists between an unmodified local copy of a second given data item and said second given data item stored in said persistent data store.

8. The system as recited in claim 6, wherein in response to determining that a difference exists between said original value of said modified local copy of said given data item and said given data item stored in said persistent data store, said first synchronization provider instance is further configured to convey an indication of said difference to said given application, and wherein said given application is further configured to resolve said difference in response to receiving said indication.

9. The system as recited in claim 6, wherein in response to determining that a difference exists between said original value of said modified local copy of said given data item and said given data item stored in said persistent data store, said first synchronization provider instance is further configured to convey a data object including said given data item stored in said persistent data store to said given application, and wherein said given application is further configured to selectively persist either said given data item conveyed via said data object or said modified local copy of said given data item.

10. The system as recited in claim 9, wherein said data object includes conflict status information corresponding to said difference.

11. The system as recited in claim 1, wherein in response to said given application modifying said local copy of said given data item, said first synchronization provider instance is configured to propagate said modification to said given data item in said persistent data store.

12. The system as recited in claim 1, further comprising a second synchronization provider instance distinct from each of said applications and configured to synchronize said modified local data subsets with said persistent data store, wherein each of said first and said second synchronization provider instances implements a respective grade of synchronization, and wherein said given application is further configured to select a given synchronization provider dependent upon said respective grades of synchronization.

13. The system as recited in claim 1, wherein said persistent data store is a relational database.

14. The system as recited in claim 1, wherein said local data subset is a JDBC rowset object.

15. The system as recited in claim 1, wherein said local data subset is disconnected from said persistent data store.

16. A method, comprising:
    storing a plurality of data items in a persistent data store;
    an application modifying a local data subset including a local copy of a given data item;
    said application selecting a given synchronization provider instance from a plurality of synchronization provider instances each configured to implement a respective grade of synchronization, wherein said selecting is dependent upon said respective grades of synchronization; and said given synchronization provider instance synchronizing said modified local data subset with said persistent data store, wherein synchronization of a given modified local copy with a corresponding data item occurs transparently to said application.

17. The method as recited in claim 16, further comprising said given synchronization provider instance locking said given data item in said persistent data store in response to said application modifying said local copy of said given data item.

18. The method as recited in claim 17, wherein locking said given data item in said persistent data store comprises locking a row of said persistent data store.

19. The method as recited in claim 17, wherein locking said given data item in said persistent data store comprises locking a table of said persistent data store.

20. The method as recited in claim 17, wherein locking said given data item in said persistent data store comprises locking said persistent data store in its entirety.

21. The method as recited in claim 16, further comprising said given synchronization provider instance determining whether a difference exists between an original value of a modified local copy of said given data item and said given data item stored in said persistent data store, in response to said application modifying said local copy of said given data item.

22. The method as recited in claim 21, further comprising said given synchronization provider instance determining whether a difference exists between an unmodified local copy of a second given data item and said second given data item stored in said persistent data store, in response to said application modifying said local copy of said given data item.

23. The method as recited in claim 21, further comprising:
in response to determining that a difference exists between said original value of said modified local copy of said given data item and said given data item stored in said persistent data store, said given synchronization provider instance conveying an indication of said difference to said application; and
said application resolving said difference in response to receiving said indication.

24. The method as recited in claim 21, further comprising:
in response to determining that a difference exists between said original value of said modified local copy of said given data item and said given data item stored in said persistent data store, said given synchronization provider instance conveying a data object including said given data item stored in said persistent data store to said application; and
said application selectively persisting either said given data item conveyed via said data object or said modified local copy of said given data item.

25. The method as recited in claim 24, wherein said data object includes conflict status information corresponding to said difference.

26. The method as recited in claim 16, further comprising:
in response to said application modifying said local copy of said given data item, said given synchronization provider instance propagating said modification to said given data item in said persistent data store.

27. The method as recited in claim 16, wherein said persistent data store is a relational database.

28. The method as recited in claim 16, wherein said local data subset is a JDBC rowset object.

29. The method as recited in claim 16, wherein said local data subset is disconnected from said persistent data store.

30. A computer-accessible medium comprising program instructions, wherein the program instructions comprise a first synchronization provider instance distinct from each of a plurality of applications and are computer-executable to:
detect that each of said plurality of applications has modified a respective local data subset including local copies of one or more of a plurality of items stored within a persistent data store, wherein a given one of said plurality of applications is configured to modify a given local data subset including a local copy of a given one of said data items; and
synchronize said modified local data subsets with said persistent data store, wherein for any of said applications, synchronization of a given modified local copy in a respective local data subset with a corresponding data item in said persistent data store occurs transparently to said applications.

31. The computer-accessible medium as recited in claim 30, wherein the program instructions are further computer-executable to lock said given data item in said persistent data store in response to detecting modification of said local copy of said given data item.

32. The computer-accessible medium as recited in claim 31, wherein to lock said given data item in said persistent data store, the program instructions are further computer-executable to lock a row of said persistent data store.

33. The computer-accessible medium as recited in claim 31, wherein to lock said given data item in said persistent data store, the program instructions are further computer-executable to lock a table of said persistent data store.

34. The computer-accessible medium as recited in claim 31, wherein to lock said given data item in said persistent data store, the program instructions are further computer-executable to lock said persistent data store in its entirety.

35. The computer-accessible medium as recited in claim 30, wherein the program instructions are further computer-executable to determine whether a difference exists between an original value of a modified local copy of said given data item and said given data item stored in said persistent data store, in response to detecting modification of said local copy of said given data item.

36. The computer-accessible medium as recited in claim 35, wherein the program instructions are further computer-executable to determine whether a difference exists between an unmodified local copy of a second given data item and said second given data item stored in said persistent data store, in response to detecting modification of said local copy of said given data item.

37. The computer-accessible medium as recited in claim 35, wherein the program instructions are further computer-executable to:
in response to determining that a difference exists between said original value of said modified local copy of said given data item and said given data item stored in said persistent data store, convey an indication of said difference to said given application, wherein said given application is configured to resolve said difference in response to receiving said indication.

38. The computer-accessible medium as recited in claim 35, wherein the program instructions are further computer-executable to:
in response to determining that a difference exists between said original value of said modified local copy of said given data item and said given data item stored in said persistent data store, conveying a data object including said given data item stored in said persistent data store to said given application, wherein said given application is configured to selectively persist either said given data item conveyed via said data object or said modified local copy of said given data item.

39. The computer-accessible medium as recited in claim 38, wherein said data object includes conflict status information corresponding to said difference.

40. The computer-accessible medium as recited in claim 30, wherein the program instructions are further computer-executable to:
in response to said given application modifying said local copy of said given data item, propagate said modification to said given data item in said persistent data store.

41. The computer-accessible medium as recited in claim 30, wherein the program instructions further comprise a second synchronization provider instance distinct from said plurality of applications, wherein the program instructions are further computer-executable to implement a respective grade of synchronization for each of said first and second synchronization provider instances, wherein said given application is configured to select a given synchronization provider dependent upon said respective grades of synchronization.

42. The computer-accessible medium as recited in claim 30, wherein said persistent data store is a relational database.

43. The computer-accessible medium as recited in claim 30, wherein said local data subset is a JDBC rowset object.

44. The computer-accessible medium as recited in claim 30, wherein said local data subset is disconnected from said persistent data store.

* * * * *